(12) United States Patent
Hipp et al.

(10) Patent No.: US 7,797,449 B2
(45) Date of Patent: Sep. 14, 2010

(54) VIRTUAL ENDPOINT

(75) Inventors: Emily L. Hipp, Oakland, CA (US);
Burton A. Hipp, Elk Grove, CA (US)

(73) Assignee: Symantec Operating Corporation, Mountain View, CA (US)

(*) Notice: Subject to any disclaimer, the term of this patent is extended or adjusted under 35 U.S.C. 154(b) by 1451 days.

(21) Appl. No.: 11/051,883

(22) Filed: Feb. 4, 2005

(65) Prior Publication Data

US 2005/0135384 A1 Jun. 23, 2005

Related U.S. Application Data

(63) Continuation of application No. 09/684,593, filed on Oct. 5, 2000, now Pat. No. 6,891,837.

(60) Provisional application No. 60/157,728, filed on Oct. 5, 1999, provisional application No. 60/157,729, filed on Oct. 5, 1999, provisional application No. 60/157,833, filed on Oct. 5, 1999, provisional application No. 60/157,727, filed on Oct. 5, 1999, provisional application No. 60/157,834, filed on Oct. 5, 1999.

(51) Int. Cl.
*G06F 15/16* (2006.01)
(52) U.S. Cl. .................. 709/245; 709/227
(58) Field of Classification Search ......... 709/201–207, 709/217–248
See application file for complete search history.

(56) References Cited

U.S. PATENT DOCUMENTS

| | | | |
|---|---|---|---|
| 4,160,877 A | 7/1979 | Vander May | |
| 5,537,417 A | 7/1996 | Sharma et al. | |
| 5,621,726 A | 4/1997 | Murakimi | |
| 5,734,865 A | 3/1998 | Yu | |
| 5,764,639 A | 6/1998 | Staples et al. | |
| 5,819,112 A | 10/1998 | Kusters | |
| 5,848,242 A | 12/1998 | Behaghel et al. | |
| 5,867,661 A | 2/1999 | Bittinger et al. | |
| 5,911,066 A * | 6/1999 | Williams et al. | ............ 719/310 |
| 5,923,854 A | 7/1999 | Bell et al. | |
| 5,951,650 A | 9/1999 | Bell et al. | |
| 6,061,349 A | 5/2000 | Coile et al. | |
| 6,094,712 A | 7/2000 | Follett et al. | |
| 6,201,962 B1 | 3/2001 | Sturniolo et al. | |

(Continued)

FOREIGN PATENT DOCUMENTS

WO 99/48261 9/1999

*Primary Examiner*—Asad M Nawaz
(74) *Attorney, Agent, or Firm*—Lawrence J. Merkel; Meyertons, Hood, Kivlin, Kowert & Goetzel, P.C.

(57) ABSTRACT

A system or network may provide for communication between two or more applications. The communication is achieved by initiating communication between a first and second application. The communication is directed from the first application to a second virtual address of the second application. An actual address associated with the second application is determined. A first data channel is established between a first computer associated with the first application and a second computer associated with the second application over a control channel, to coordinate the communication over the first data channel. The communication is then directed to the actual address associated with the second application over the data channel. Further, the first data channel is taken down and a second data channel is established to maintain communication without the knowledge of the first and second applications.

21 Claims, 11 Drawing Sheets

U.S. PATENT DOCUMENTS

| | | |
|---|---|---|
| 6,216,159 B1 | 4/2001 | Chintakrindi et al. |
| 6,247,057 B1 | 6/2001 | Barrera, III |
| 6,327,622 B1 | 12/2001 | Jindal et al. |
| 6,430,622 B1 | 8/2002 | Aiken et al. |
| 6,542,934 B1 | 4/2003 | Bader et al. |
| 6,587,877 B1 * | 7/2003 | Douglis et al. ............... 709/224 |
| 6,609,153 B1 | 8/2003 | Salkewicz |
| 6,704,282 B1 | 3/2004 | Lala et al. |
| 6,707,820 B1 | 3/2004 | Arndt et al. |
| 6,714,549 B1 | 3/2004 | Phaltankar |
| 6,766,371 B1 | 7/2004 | Hipp et al. |
| 6,970,913 B1 | 11/2005 | Albert et al. |
| 7,210,147 B1 | 4/2007 | Hipp et al. |
| 7,680,899 B1 * | 3/2010 | Barnes et al. ............... 709/217 |
| 2004/0058682 A1 * | 3/2004 | Kitchin ...................... 455/445 |
| 2005/0132063 A1 * | 6/2005 | Belt et al. ................... 709/227 |
| 2006/0120518 A1 * | 6/2006 | Baudino et al. .......... 379/91.02 |
| 2007/0054627 A1 * | 3/2007 | Wormald ..................... 455/70 |

* cited by examiner

VIRTUAL ENDPOINT

REFERENCE TO RELATED APPLICATIONS

This application is a continuation of U.S. patent application Ser. No. 09/684,593, filed Oct. 5, 2000 now U.S. Pat. No. 6,891,837, which claims priority to the following applications: DYNAMIC SYMBOLIC LINK RESOLUTION, Prov. No. 60/157,728, filed on Oct. 5, 1999; SNAPSHOT VIRTUAL TEMPLATING, Prov. No. 60/157,729, filed on Oct. 5, 1999; SNAPSHOT RESTORE OF APPLICATION CHAINS AND APPLICATIONS, Prov. No. 60/157,833, filed Oct. 5, 1999; VIRTUAL RESOURCE-ID MAPPING, Prov. No. 60/157,727, filed on Oct. 5, 1999; and VIRTUAL PORT MULTIPLEXING, Prov. No. 60/157,834 filed on Oct. 5, 1999. The above applications are incorporated herein by reference.

FIELD

The present invention relates generally to resource management in a computer network. More specifically, the present invention relates to a virtual endpoint or switching of data channels between a plurality of applications operating on a computer network.

BACKGROUND

In prior art computer network communications between applications is limited to the static attributes of the communications endpoint. When a communications endpoint is created, it has implicit attributes associated with the type of endpoint created (e.g. TCP/UDP). In addition to the implicit attributes of the endpoint, the application assigns other explicit attributes to the endpoint. For example, if the endpoint is of type TCP socket, the application assigns a local address to the endpoint by binding the socket to a local address. In addition, the application assigns a remote address attribute to the endpoint by connecting the socket to a remote address. These attributes are associated with the endpoint until either the endpoint is destroyed or possibly until the client application changes the attributes of the endpoint.

The endpoint attributes, both implicit and explicit, are typically specified at the time the application is created, at the time the application is run or at the time the endpoint gets created. However in a highly dynamic runtime environment, the attributes initially assigned to the endpoint often are non-optimal for the current operating system and/or network state, resulting in less efficient usage of system resources and/or non-optimal use of network communications. In the prior art, applications attempting to be tuned to a dynamic environment have the logic embedded within the application to monitor the system/network state and adjust its communications accordingly. However this is highly dependent on the running system environment and beyond the scope of most application.

SUMMARY

To achieve the foregoing, and in accordance with the purpose of the present invention, a system or network is disclosed which provides for communication between two or more applications. The communication is achieve by initiating communication between a first and second application. The communication is directed from the first application to a second virtual address of the second application. An actual address associated with the second application is determined. A first data channel is established between a first computer associated with the first application and a second computer associated with the second application over a control channel, to coordinate the communication over the first data channel. The communication is then directed to the actual address associated with the second application over the data channel. Further, the first data channel is taken down and a second data channel is established to maintain communication without the knowledge of the first and second applications.

BRIEF DESCRIPTION OF THE DRAWINGS

The invention, together with further advantages thereof, may best be understood by reference to the following description taken in conjunction with the accompanying drawings in which.

DETAILED DESCRIPTION

Figure 1A:
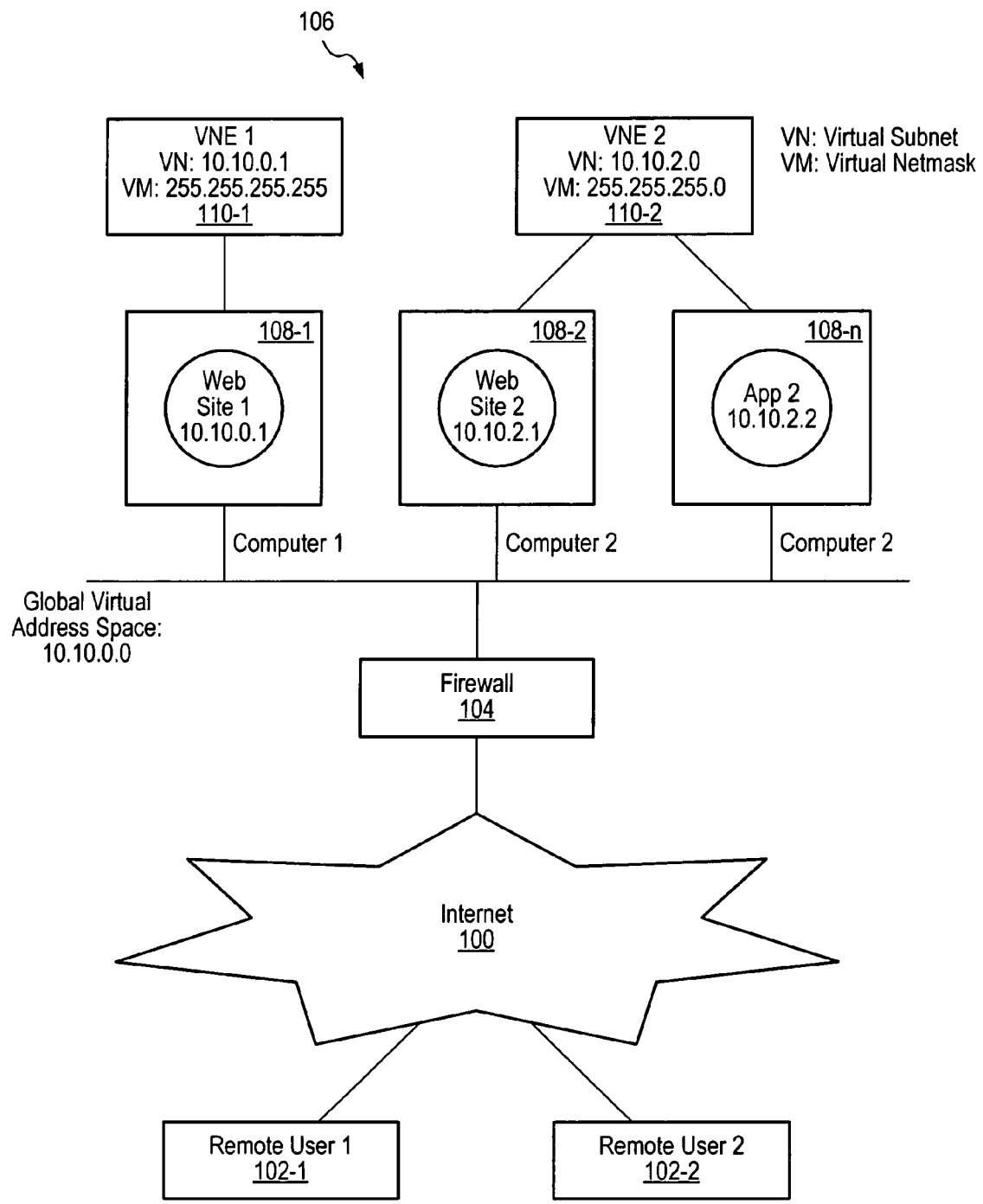
FIG. 1A is a high level block diagram illustrating the various components of a computer network used in connection with the present invention.

Among other aspects and innovations, the invention provides structure, system, method, method of operation, computer program product, and business model and method for providing virtual endpoints. Virtual endpoints virtualize the communication endpoints (i.e., sockets) an application uses for network communications. Virtual endpoints allow the network communications to become decoupled from the application allowing the underlying communication channels to be dynamically manipulated, without the application's knowledge. The inventive virtual endpoints provide the ability to maintain communication between two or more applications or processes while allowing the data path or communication channel to be manipulated or changed without affecting the communication or corrupting the data. The present invention allows a data stream to be initially established between two or more applications on a first data channel and to allow the data stream to be shifted or rerouted to alternative data channels without affecting or losing data in the communication. Further, the channel is changed or rerouted without the knowledge of the two or more communicating applications and without the assistance of the communicating applications. From the view point of the communicating applications, the routing of the communication is unchanged. In one embodiment, the present invention allows for the dynamic construction and deconstruction of network communication channels performed transparently to the applications communicating.

Another advantage provided by the virtual endpoints is that one or more of the applications or processes communicating can be shifted to alternate computers or servers while the communication between the two or more applications is unaffected. The present invention eliminates the necessity of operating applications or processes from a single machine in order to maintain communication and data connections with other applications or processes. The present inventive virtual endpoints further avoid the requirement of providing a direct communication path between computers, applications or processes of prior art systems to maintain communication which restricting the applications and processes to be operated from a single machine. The present virtual endpoints enable a computer network, computer, processor, microprocessor, server and other computational systems to maintain communication and data connections between computers, applications or processes without limiting an application to be operated from a single computer, server or processor.

Where the prior art limits the operation of applications to a single computer in order to maintain communication and data connections with other applications, the present novel virtual endpoint allows a computational system having two or more computers to shift applications between the plurality of computers while still maintaining the communication and data connections with other application to provide a computer network with the ability to optimize system resources. Further, the present invention allows an endpoint to be set up initially with one set of attributes, and then shifted dynamically to another set of attributes. For example, an application can be communicating with a remote application using one of two interfaces, interface A and interface B, installed on the host. The local address of the endpoint is the address of the interface being used. Initially the data channel is set up to use one interface, for example interface A. As a result the endpoints are using the address of interface A as the local address. Then interface A gets removed from the host. With prior art, since interface A no longer existed, the existing communication on endpoints with the local address of interface A, would be terminated and the application would be disrupted. The present invention allows the open/established communications channel to be switched to interface B for new and existing communications channels. Including changing the local address attribute of the endpoints. Similarly, the other endpoint attributes can also be dynamically adjusted by reconstructing the data channel.

FIG. 1A illustrates in high level block diagram form the overall structure of the present invention as used in connection with a global computer network 100 such as the Internet. Remote users 102-1 and 102-2 can connect through the computer network 100 to a private network of computers 106 protected by firewall 104. Computer network 106 is a network comprising computers 108-1, 108-2, through 108-n, where n is the total number of computers in network 106. Computers 150 are used to run various applications, as well as host web sites for access by remote users 102. The present invention is implemented on computer network 106 in the form of virtual environments 110-1 and 110-2. While only two virtual environments are illustrated, it is to be understood that any number of virtual environments may be utilized in connection with the present invention.

Figure 1B:
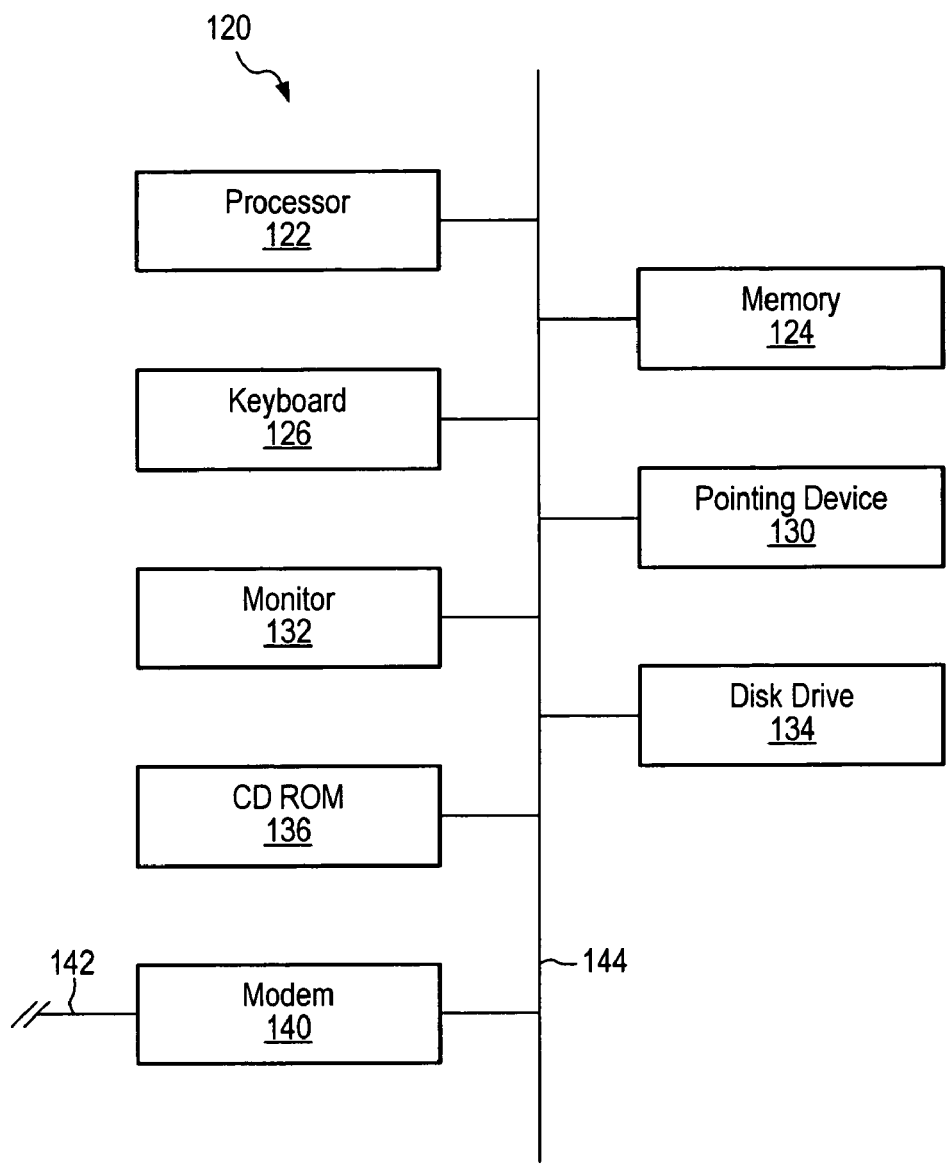
FIG. 1B is a high level block diagram depicting a computer used in connection with the present invention.

In one embodiment, the method and system of the present invention is implemented in a computer readable medium, such as a computer program and executed on a computer 120 as illustrated in the high level block diagram of FIG. 1B. As shown, computer 120 incorporates a processor 122 utilizing, in one embodiment, a central processing unit (CPU) and supporting integrated circuitry. A memory 124 which is any type or combination of memory including fast semiconductor memory (e.g., RAM, NVRAM or ROM), slower magnetic memory (e.g., hard disk storage), optical memory and any conventional memory known in the art, to facilitate storage of the computer program 118 and the operating system software. In one embodiment, also included in computer 120 are interface devices including, but not limited to, keyboard 126, pointing device 130, and monitor 132, which allow a user to interact with computer 120. Mass storage devices such as disk drive 134 and CD ROM 136 may also be included in computer 120 to provide storage of information. Computer 120 may communicate with other computers and/or networks via modem 140 and telephone line 142 to allow for remote operation, or to utilize files stored at different locations. Other media may also be used in place of modem 140 and telephone line 142, such as a direct connection, high speed data line or a wireless connection, and the like. In one embodiment, the components described above may be operatively connected by a communications bus 144. In one embodiment, the components may be operatively connected by wireless communication.

Figure 2:
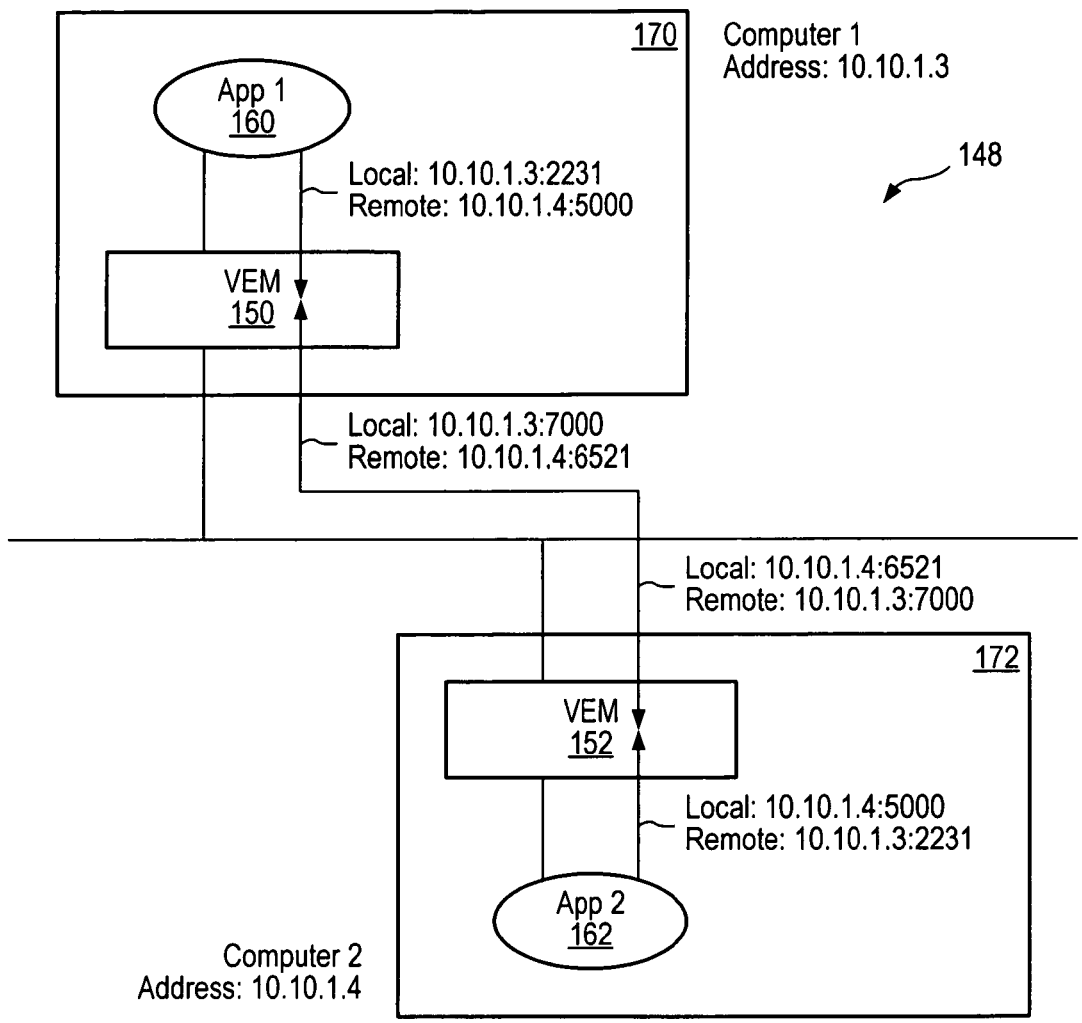
FIG. 2 shows a simplified block diagram of one implementation of one embodiment of the present virtual endpoint system.

FIG. 2 shows a simplified block diagram of one implementation of one embodiment of the present virtual endpoint system 148. The virtual endpoint system 148 allows a first application 160 to communicate with a second application 162 while the system varies the data channel utilized to establish the communication path. In one embodiment, an application communicating has a socket or endpoint address. In one embodiment, the endpoint address includes a host address and a port number. For example, the first application's address is 10.10.1.3:2231, and the second application's address is 10.10.1.4:5000. When first application 160 attempts to communicate with the second application 162, the first application directs the communication to the endpoint address of the second application, 10.10.1.4:5000. However, in one embodiment, the addresses that each application uses are virtual addresses and not the actual address utilized by the virtual endpoint system 148 for routing the communication. In one embodiment, the virtual addresses are established for the application and remain constant during the life of the application. The communication forwarded by the first application 160 directed at the second application 162 utilizing the second application's virtual address (10.10.1.4:5000) is initially received by or routed through a first virtual endpoint module (VEM) 150. The first VEM 150 determines an actual address in which to direct the communication in order to accurately connect the communication. In one embodiment, the actual address is based on the actual node or computer from which the application is being operated. For example, the second application 162, is operated from second computer 172 which has an address of 10.10.1.4. As such, the actual address for the second application 162 would be the address of the computer and a port to that computer, for example, 10.10.1.4:6521. When the first application 160 sends the communication to the second application 162 directed at the virtual address (10.10.1.4:5000), the first VEM 150 receives the communication and redirects the communication to the actual address (10.10.1.4:6521). A second VEM 152 receives the communication directed at the second application 162, at the actual address (10.10.1.4.6521), and forwards the communication to the second application 162. The second VEM 152 forwards the communication transparently so that the second application 162 is unaware that the communication was rerouted utilizing an address other than the virtual address. Thus the communication channel established between the applications is virtual and the applications are unaware of the actual communication path taken to deliver the communication. The applications 160, 162 are unaware that socket calls are routed to the VEMs 150, 152. As such, the data channel 166 utilized to provide communication between two applications can be dynamically constructed, destructed and reconstructed without the knowledge of the communicating applications. The first and second VEMs 150, 152 coordinate over a control channel 164 the transparent construction and destruction of the data channel 166. In one embodiment, the VEM resides below the socket communications layer within a computer's operating system.

In one embodiment, the virtual addresses associated with an endpoint are specified by the application, for example, where an application binds to a well-known address. In one embodiment, a virtual address is dynamically allocated by the VEM, for example, where no local address binding is performed by the application. In the case of dynamic allocation, the VEM assigns a unique virtual address (address/port pair) the first time a local address is required. For example, if no bind is performed by the application, the VEM assigns a local virtual address before a connect is performed on the socket, such as a TCP socket, or before data is sent to a socket, such as a UDP socket.

Figure 3:
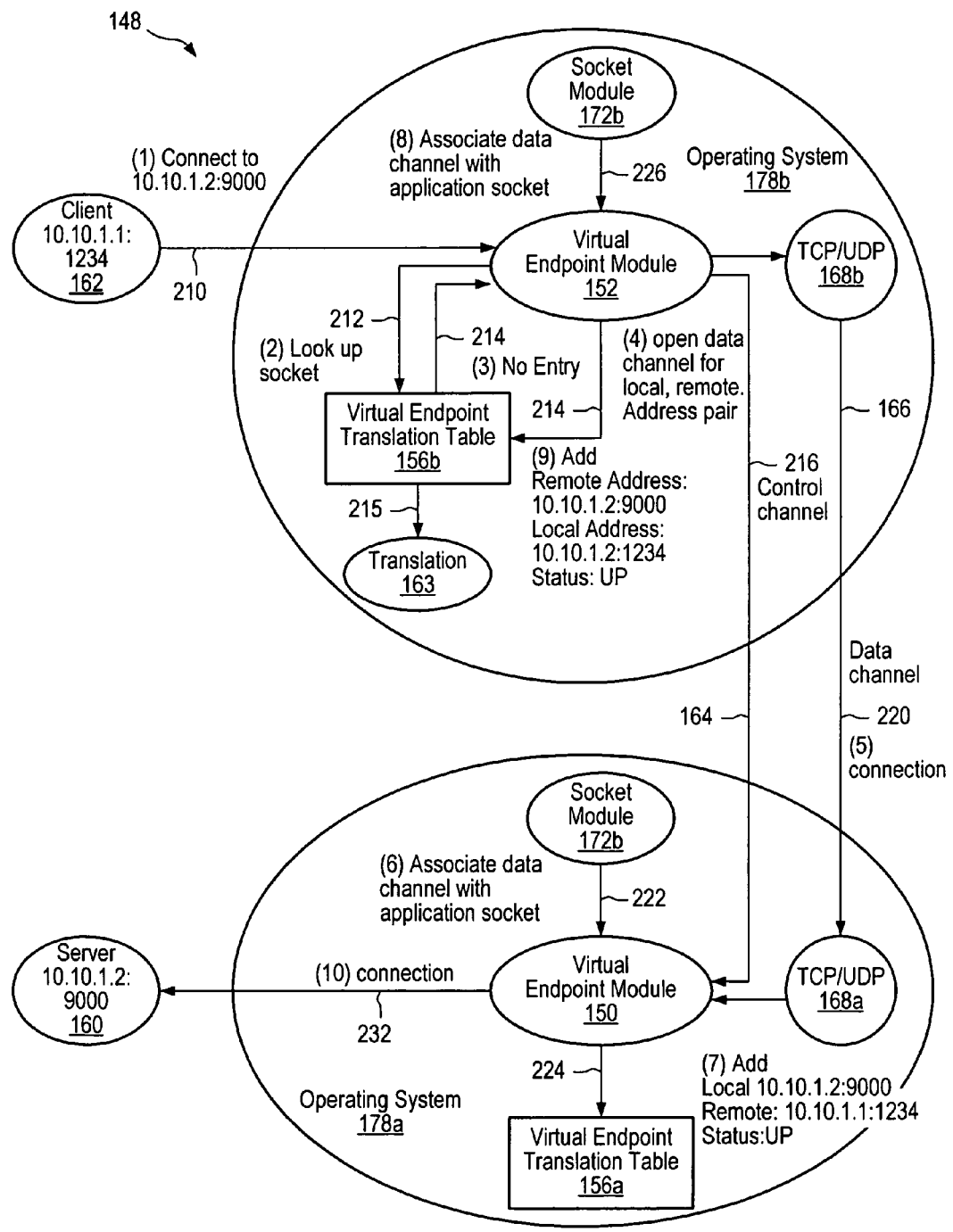
FIG. 3 shows a simplified block diagram of one implementation of one embodiment of the VEM system similar to that of FIG. 2 establishing a communication channel connection.

FIG. 3 shows a simplified block diagram of one implementation of one embodiment of the VEM system 148 establishing a communication channel connection. In this embodiment, the second application 162 attempts to establish a communication connection with the first application 160 (step 210). In the embodiment shown in FIG. 3, the first and second VEMs 150, 152 are operated from an operating system 178a and 178b of a first and second computer (not shown). The socket call is routed through the second computer (not shown) having a second operating system 178b to the second VEM 152. The second VEM 152 receives the attempt to connect from the second application 162 addressing the communication to the virtual address of the first application 160. The second VEM 152 determines if the socket or endpoint has an established data channel for communication between the first and second applications (step 212). In one embodiment, the second VEM 152 utilizes a second virtual endpoint translation table 156b, such as a data structure, and looks up the endpoint to determine if a data channel has been established (again, step 212) with the second application 162. When the communication path is initially being established the second VEM 152 finds that no entry exists for this communication path in the second virtual endpoint translation table 156b (step 214).

In one embodiment, because there is no entry in the virtual endpoint translation table, an address translation process (step 215) is performed on the remote virtual IP address by a translation module 163 to determine the actual address of the host where the first application 160 resides. In one embodiment the translation module 163 is implemented external to the system 148. The translation process (step 215) returns the actual IP address of the host where the first application 160 is running. In one embodiment, the translation module includes an address lookup table and provides the correlations between the virtual addresses and actual addresses. The second VEM 152 uses this actual IP address in conjunction with a previously established static port number to determine the address of VEM 150.

Still referring to FIG. 3, the second VEM 152 then communicates with the first VEM 150 associated with the first application 160, and establish a communication path through a data channel 166 for allowing the communication between the first and second applications (step 216). In one embodiment, the communication between the second VEM 152 and the first VEM 150 is through a control channel 164. The control channel 164 is any communication channel which is designated as a control channel for at least the communication between the VEMs to coordinate the construction and deconstruction of data channels. In one embodiment, the first VEM 150 will communicate back to the second VEM 152 establishing the communication between first and second applications across the data channel 166. The first and second VEMs 150, 152, then connect the data channel 166 between protocol modules 168a-b. The protocol modules 168a-b can be substantially any protocol implementation providing data channel communication including, TCP layers, UDP layers and other protocol modules (step 220).

Still referring to FIG. 3, once the data channel 166 is established, the first VEM 150 associates the first application endpoint or socket with the newly established data channel 166. In one embodiment, the first application endpoint is established by pointing the file descriptor associated with the endpoint to the new data channel 166. In one embodiment, the first VEM 150 associates the data channel 166 with the application socket or endpoint related with the first application 160 (step 222) through a first socket module 172a. The first socket module 172a associates the new data channel 166 with the existing socket endpoint, in one embodiment, by pointing the file descriptor associated with the endpoint to the new data channel 166. The socket module 172a-b can be substantially any networking socket implementation and the data structures associated with implementation. First VEM 150 further stores or records the communication channel mapping between the first and second applications 160 and 162 in the first virtual endpoint translation table 156a (step 224). In one embodiment, the information stored in the virtual endpoint translation table includes the virtual addresses of the communication applications, for example, first and second applications' virtual addresses (10.10.1.2:9000 and 10.10.1.1:1234), the associated endpoint or socket, as well as the actual addresses utilized for routing the communication over data channel 166, for example, 10.10.1.2:7000 and 10.10.1.1:6521. In one embodiment, the virtual address translation table also includes a status of the communication path between the first and second applications which designates the channel as active or up, and deactivated or down. The second VEM 152 associates the second application endpoint or socket with the newly established data channel 166, in one embodiment, by pointing the file descriptor associated with the endpoints to the new data channel 166. In one embodiment, second VEM 152 associates the data channel 166 with an application socket related with the second application 162 (step 226) through a second socket module 172b. The second VEM 152 also records the communication channel mapping in the second virtual endpoint translation table 156b (step 230). Once the data channel 166 is established the first VEM 150 establishes a connection with the first application 160 (step 232) allowing data communication to proceed.

The data channel 166 is substantially any transport layer data communication service allowing communication between at least two applications or computers including connection-oriented protocol, connectionless protocol and other communication protocols.

In one embodiment, the VEMs 150, 152 transparently manipulates the data channels without the knowledge of the communicating applications. When a new data channel 166 is constructed, the VEMs 150, 152 transparently hook the data channel 166 into the endpoint of the running application, for example the second application 162. Since the network connections are routed through the VEMs, rather than directly to the applications, the applications are not notified when a data channel has been closed. The VEM dynamically sets up a data channel between two applications, and directs the data over the data channel.

Figure 4:
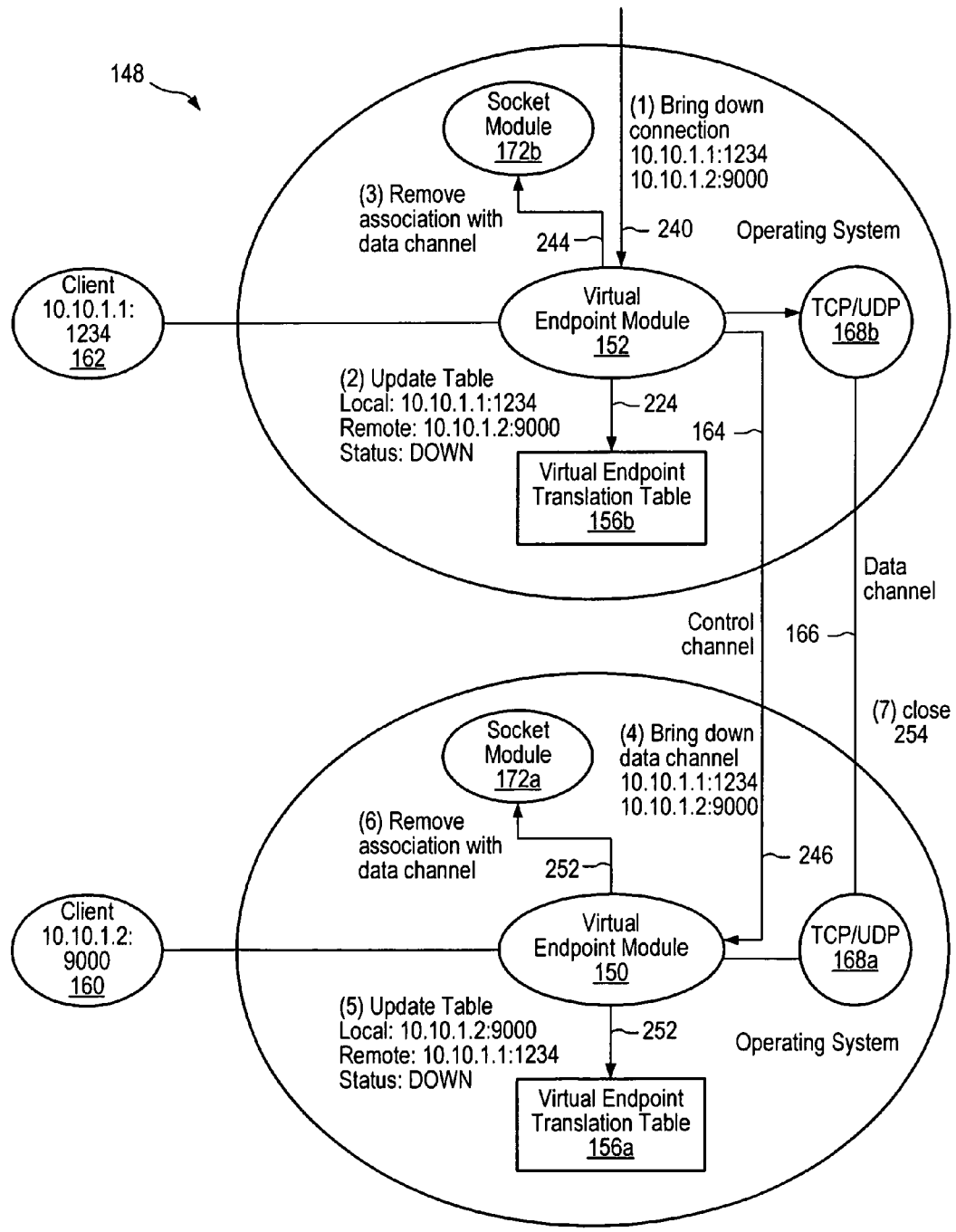
FIG. 4 shows a simplified block diagram of one embodiment of the VEM system, similar to that shown in FIGS. 2 and 3, destructing or bringing down a data channel connection.

FIG. 4 shows a simplified block diagram of one embodiment of the VEM system 148 destructing or bringing down a data channel connection. A data channel is taken down, in one embodiment, when one of the VEMs controlling the communication path between the communicating applications is signaled to bring down the data channel. The signal to bring down the channel is issued from one of several components external to the VEM, for example an external processor or external controller which provides overall control for the VEM system 148. In one embodiment, the data channel 166 is brought down if it remains unused or inactive for a predefined period. When one or both of the VEMs, for example the second VEM 152, receive a signal to bring down the data channel 166 (step 240), the second VEM 152 signals an update to the virtual endpoint translation table 156b to update the status of the communication path between the first and second applications as down (step 242). The second VEM 152 signals the second socket module 172b to remove the socket association with the data channel 166 (step 244). The second VEM 152 also communicates with the first VEM 150 over the control channel 164 signaling the first VEM 150 to also take down the data channel 166 (step 246). The first VEM 150 receives the signal and signals the first virtual endpoint translation table 156a to update the status of the communication path to down (step 250). The first VEM 150 also signals the first socket module 172a to remove the socket association with the data channel 166 (step 252). Once one or both of the socket associations for the applications are removed the data channel 166 is closed (step 254) preventing further communication between the first application 160 and the second application 162 over that data channel 166.

Figure 5:
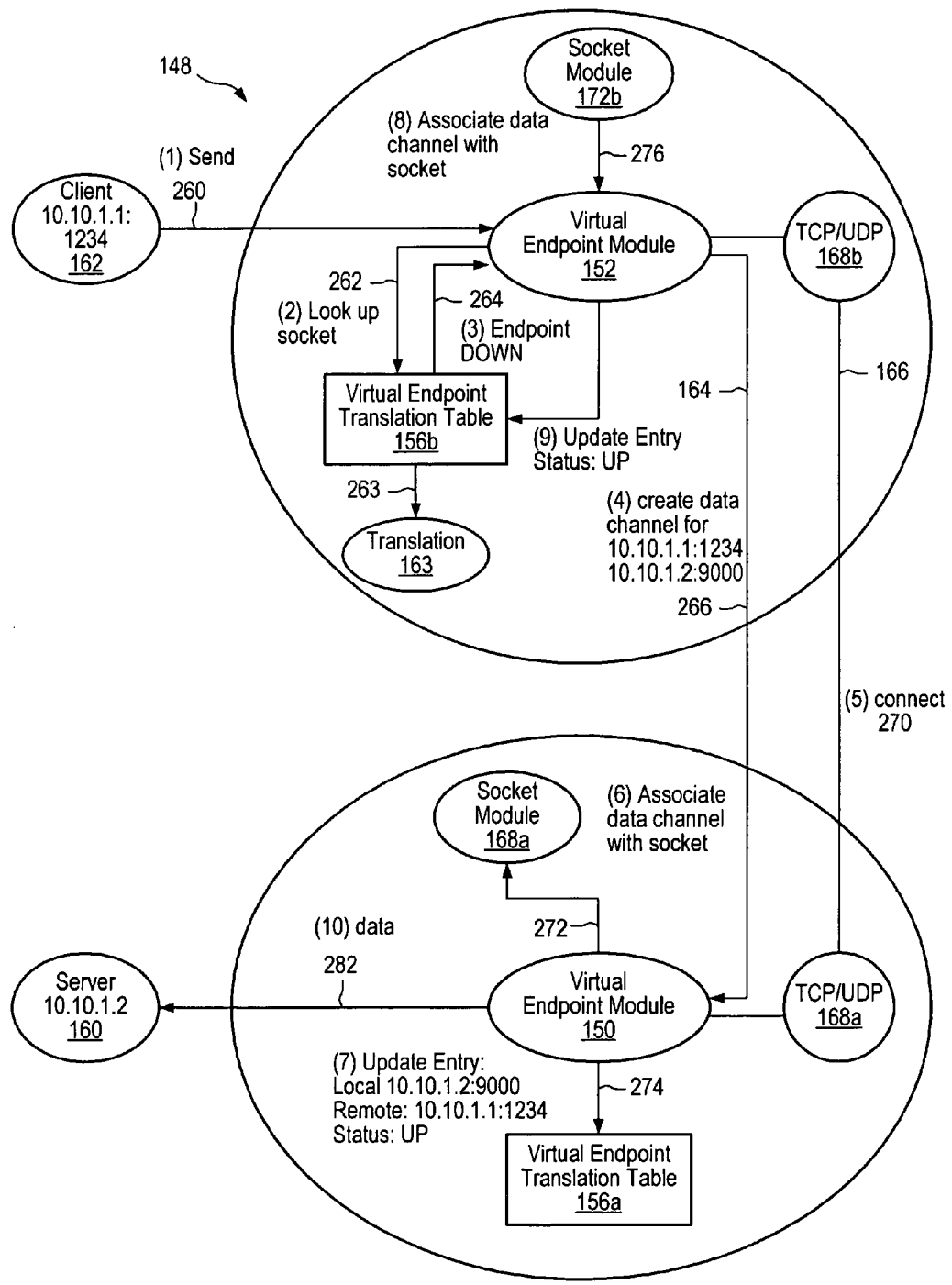
FIG. 5 shows a simplified block diagram of one embodiment of the VEM system, similar to that shown in FIGS. 2-4, reconstructing or bringing back up a data channel connection.

FIG. 5 shows a simplified block diagram of one embodiment of the VEM system 148 reconstructing or bringing back up a data channel connection. One of the advantages provided by the present VEM system 148 is that the communication path between two or more applications can be reestablished on the same data channel or a completely different data channel without affecting the communication between the applications, without the knowledge of the applications, without the assistance of the applications and without reconfiguring the applications. In one embodiment, the reconstruction of a data channel between two applications, for example the first and second applications 160 and 162, is signaled by one of the applications, for example the second application 162, attempting to transmit or send data to the first application 160. Alternatively, the reconstruction can be issued by one of several components external to the VEM, for example an external processor or external controller.

In the embodiment depicted in FIG. 5, the second application 162 attempts to send data to the first application 160 (step 260) which signals the second VEM 152 to reconstruct the communication path between the second application 162 and the first application 160. The second VEM 152 signals the virtual endpoint translation table to determine if the applications have an established and active data channel (step 262). If the data channel 166 is no longer established, an entry will no longer exist in the virtual endpoint translation table. As such, an address translation process (step 263) is performed on the virtual IP address by a translation module 163 to determine the actual address of the host where the first application 160 resides. The virtual endpoint translation table returns a status down signal notifying the second VEM 152 that the data channel is inactive (step 264). The second VEM 152 communicates with the first VEM 150 over the control channel 164 to establish a data channel (step 266). The first and second VEMs 150, 152, will then connect the data channel 166 between protocol module 168a-b (step 270). One advantage of the present invention is that the reconstruction of the data channel 166 does not require the use of the same data channel as was originally used to establish the communication path. The present invention allows any one of a plurality of data channels to be utilized in constructing and reconstructing the data channel 166. The first and second VEMs 150 and 152 signal the first and second socket module 172a and 172b, respectively, to associate the data channel with the allocated sockets (steps 272 and 276, respectively). The first and second VEMs 150 and 152 further signal an update to the first and second virtual endpoint translation tables 156a, 156b to update the status from down to up (steps 274 and 280, respectively). Once the data channel is connected, the first application 160 receives the communication from the second application 162 (step 282).

Figure 6A:
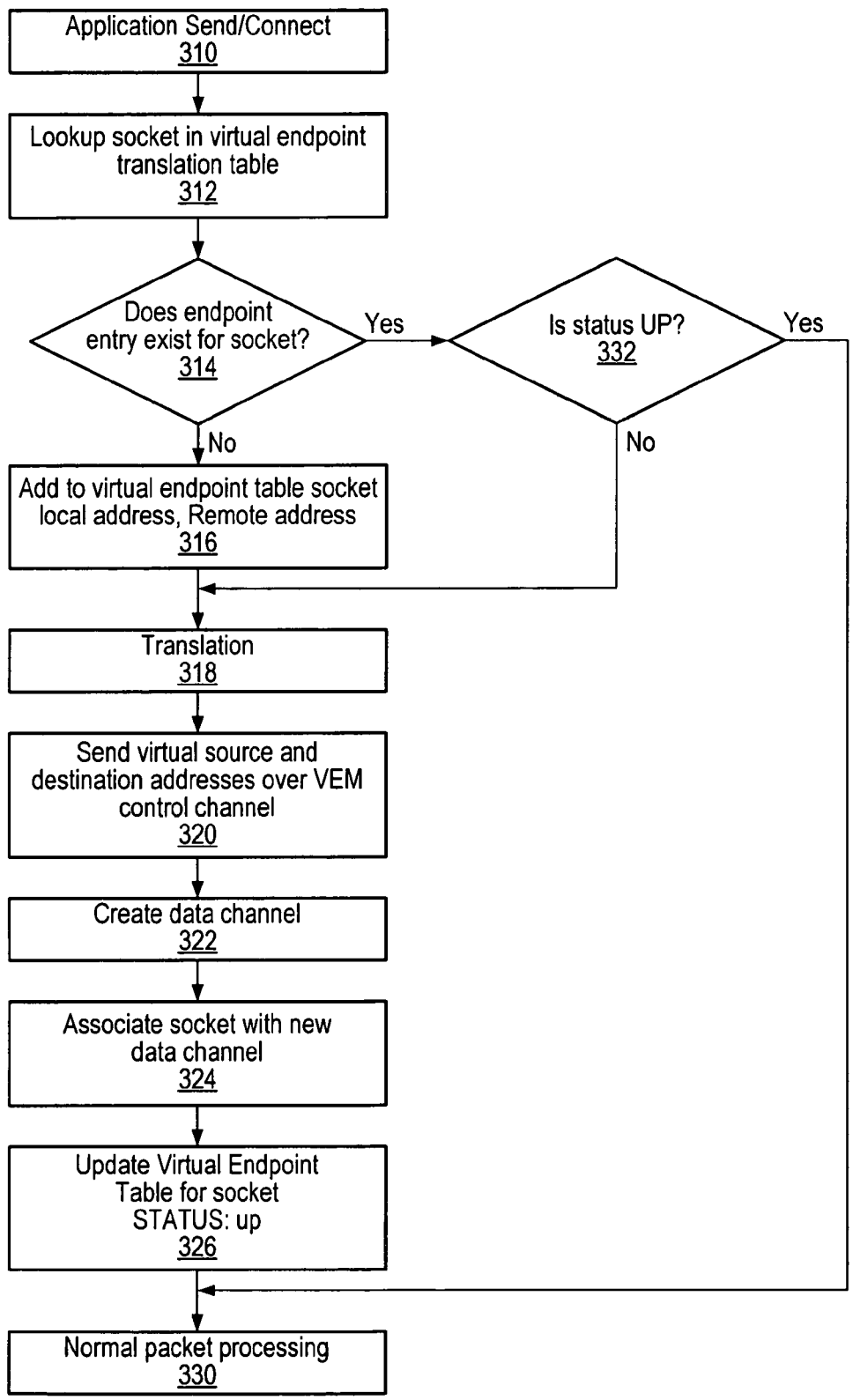
FIG. 6A shows a simplified flow diagram of a first application transmitting or sending data to a second application.

FIG. 6A shows a simplified flow diagram of a first application transmitting or sending data to a second application. In step 310, the first application sends or attempts to connect with the second application. In step 312, the VEM signals the virtual endpoint translation table to look up the socket assigned for the communication between the first and second applications. In step 314, it is determined if an entry for the socket exists. If not, then step 316 is entered where, in one embodiment, at least the socket, the local address (i.e., first application's address) and the remote address (i.e., second application's address) are added to the virtual endpoint translation table. Step 318 is then entered in which the virtual to actual address translation is performed by the translation module 163 to determine the actual address. In step 320 the virtual source address and virtual destination addresses are forwarded over the control channel 164 to the VEM associated with the second application. In step 322 a data channel is created. In step 324, the socket is associated with the new data channel. In step 326, the virtual endpoint translation table is updated for the specific socket to record an active or up status for the data channel. In step 330, data packet processing is performed for the transmission of the data. Returning to step 314, if the entry for the socket does exist, then step 332 is entered where it is determined if the existing data channel is active. If not, then step 320 is entered where the virtual source and destination addresses are forwarded over the control lines to establish the data channel. If, in step 332, the data channel is up, then step 330 is entered allowing packet processing.

Figure 6B:
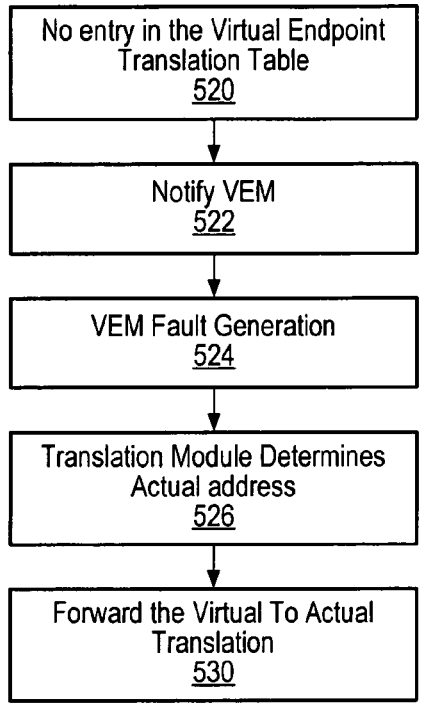
FIG. 6B shows a simplified flow diagram of one implementation of one embodiment of the translation process performed by the translation module.

FIG. 6B shows a simplified flow diagram of one implementation of one embodiment of the translation process performed by the translation module 163. In the embodiment shown in FIG. 6B, initially in step 520 the second virtual endpoint translation table 156b determines there is no entry for an established communication path between the first and second applications 160, 162 (step 214, FIG. 3). In step 522 the second virtual endpoint translation table 156b notifies the second VEM 152 that no entry exist (step 214) and in step 524 the second VEM 152 generates a fault on the address. The fault signals the translation module 163, in step 526, which determines the actual address associated with the host running the first application 160. In step 530 the translation module 163 sends the second VEM 152 the virtual to actual address translation.

Figure 7:
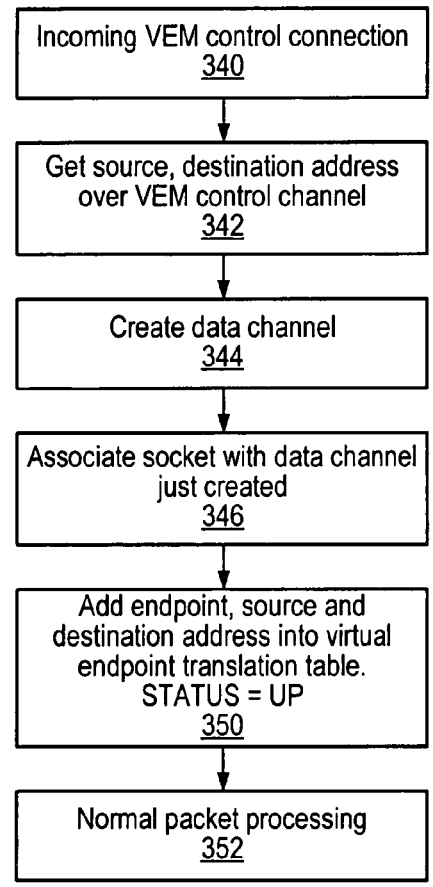
FIG. 7 shows a simplified flow diagram of a second application receiving data over a data channel from a first application.

FIG. 7 shows a simplified flow diagram of a second application receiving data over a data channel from a first application. In step 340, the second VEM receives a signal over the control channel from the first VEM attempting to establish a data channel to allow data communication between the first and second applications. In step 342, the second VEM receives the virtual source address and virtual destination address over the control channel from the first VEM. In step 344 the data channel is established to provide the data communication between the first and second application. In step 346, the second VEM signals the second socket module to associate the socket with the data channel created in step 344. In step 350, the virtual endpoint translation table is updated, in one embodiment, with at least the virtual source address (i.e., first application's address) and the virtual destination address (i.e., second application's address). In step 352, packet processing for data transmission is performed.

One advantage of the present invention is the VEM system 148 allows a data channel to be taken down to free up resources allowing other applications to utilize the freed resources. Additionally, when the first and second applications 160 and 162 attempt to transmit data again, the present invention allows the original or a new data channel connection to be established allowing the communication to again take place. The destruction and reconstruction of the data channel has no effect on the data being transferred. Further, the applications have no knowledge that the data channel was taken down or reestablished. In one embodiment, the deconstruction of a data channel occurs when a first application is shutdown or moved to an alternative computer, and the reconstruction of the data communication over a new data channel is provided between the first application and the second application now operating from a new computer.

By maintaining the communication paths between two or more applications, the present virtual endpoints, in one embodiment, permit a computer system (having two or more computers) to take down, halt or snapshot an application which can then be revived on the initial computer or a different computer of the system. Permitting an initial application to be halted allows a computer system to free up computational resources for an alternative application. For example, a first application running on a first computer can be halted and stored to a memory when the first application is not actively interacting with a second application. Once the first application is stored, the first computer can remove the first application and can initiate a third application. When the second application attempts to communicate with the first application, the first application can be reactivated on an alternative second computer without interfering with the data connection between the first and second applications.

One example of the ability to halt or snapshot an application along with all its accompanying states and data is described in co-pending U.S. patent application Ser. No. 09/684,373, entitled "Snapshot Virtual Templating," filed on Oct. 5, 2000, incorporated herein by reference. One example of the ability to reinitialize an application along with all its accompanying states and data is described in co-pending U.S. patent application Ser. No. 09/680,847, entitled "Snapshot Restore of Application Chains and Applications," filed on Oct. 5, 2000, incorporated herein by reference.

The present invention provides snapshot virtual templating by creating virtual application templates for the purpose of propagating a single application snapshot into multiple, distinct images. Snapshot virtual templates allow multiple application instances to use the same fixed resource identifier by making the resource identifier virtual, privatizing it, and dynamically mapping it to a unique system resource identifier. When a snapshot is cloned from a virtual template, the common or shared data is used exactly as is, whereas the non-sharable data is either copied-on-write, multiplexed, virtualized, or customized-on-duplication. The present invention greatly reduces the required administrative setup per application instance. Snapshot virtual templating works by noting access to modified resources, fixed system IDs/keys and unique process-related identifies and automatically inserting a level of abstraction between these resources and the application. The resources contained in a snapshot virtual template can be dynamically redirected at restore time. Access to memory and storage is managed in a copy-on-write fashion. System resource handles are managed in a virtualize-on-allocate fashion or by a multiplex-on-access mechanism. Process-unique resources are managed in a redirect-on-duplicate fashion. Rules may be defined through an application configurator that allows some degree of control over the creation of non-sharable data.

The present invention provides snapshot restoring by saving all process state, memory, and dependencies related to a software application to a snapshot image. Interprocess communication (IPC) mechanisms such as shared memory and semaphores must be preserved in the snapshot image as well. IPC mechanisms include any resource that is shared between two process or any communication mechanism or channel that allow two processes to communicate or interoperate is a form of IPC. Sockets, shared memory, semaphores and pipes are some examples of IPC mechanisms. Between snapshots, memory deltas are flushed to the snapshot image, so that only the modified-pages need be updated. Software modules that track usage of resources and their corresponding handles are included as part of the snapshot/restore framework of the present invention. At snapshot time, state is saved by querying the operating system kernel, the application snapshot/restore framework components, and the process management subsystem that allows applications to retrieve internal process-specific information not available through existing system calls. At restore time, the reverse sequence of steps for the snapshot procedure is followed and state is restored by making requests to the kernel, the application snapshot/restore framework, and the process management subsystem.

Figure 8A:
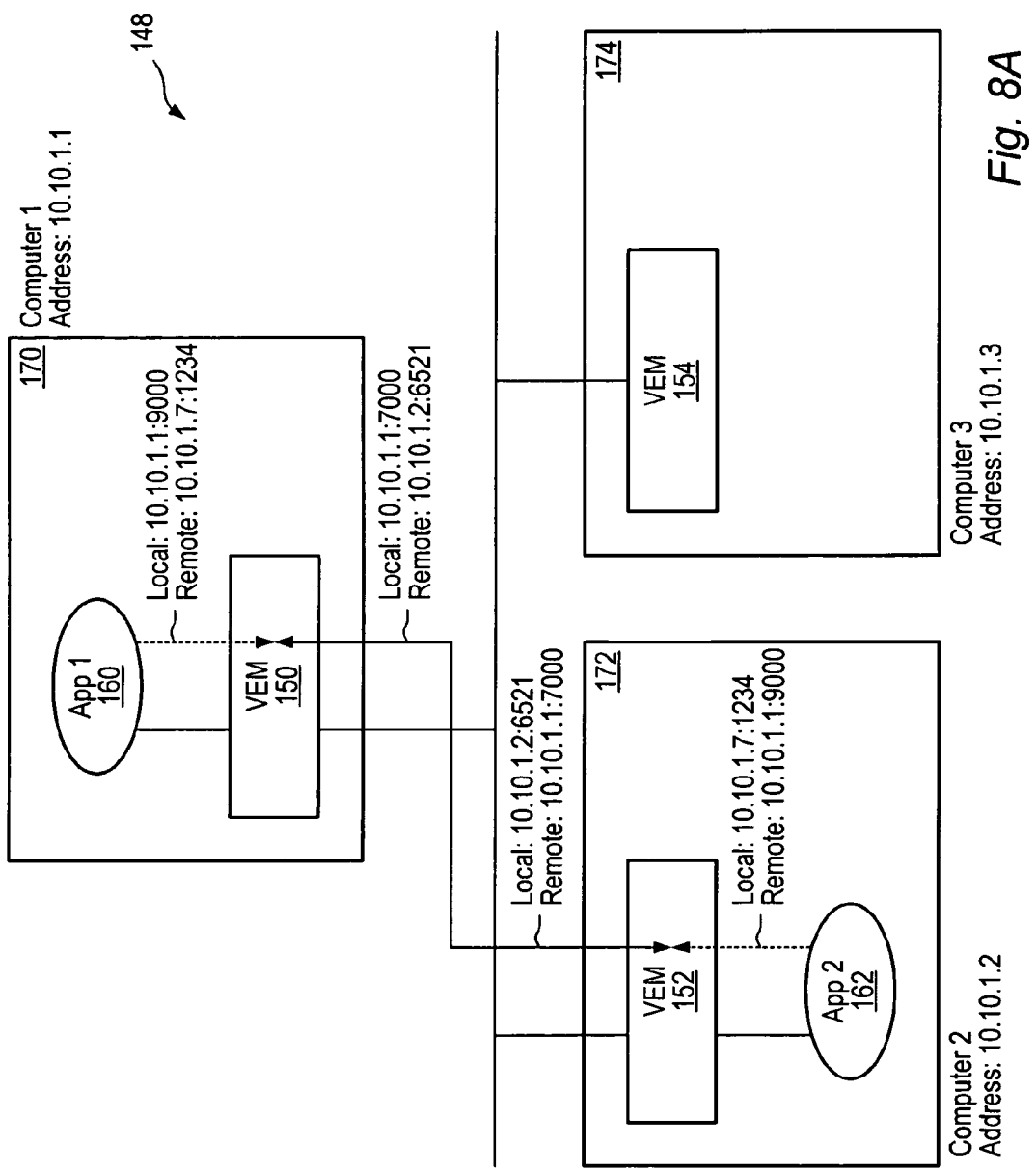
FIG. 8A shows a simplified block diagram of the VEM system of the present invention providing communication between a first application and a second application similar to that shown in FIG. 2.

FIG. 8A shows a simplified block diagram of the VEM system 148 of the present invention providing communication between a first application 160 and a second application 162 similar to that shown in FIG. 2. The first application is operating from a first computer 170 and the second application is operating on a second computer 172. A third computer 174 is also shown having a third VEM 154. The present invention facilitates the ability to shift the operation of an application, for example the second application 162, from one computer, for example the second computer 172, to another computer, for example, to the third computer 174, and still maintain a communication path between the first and second applications 160, 162.

Figure 8B:
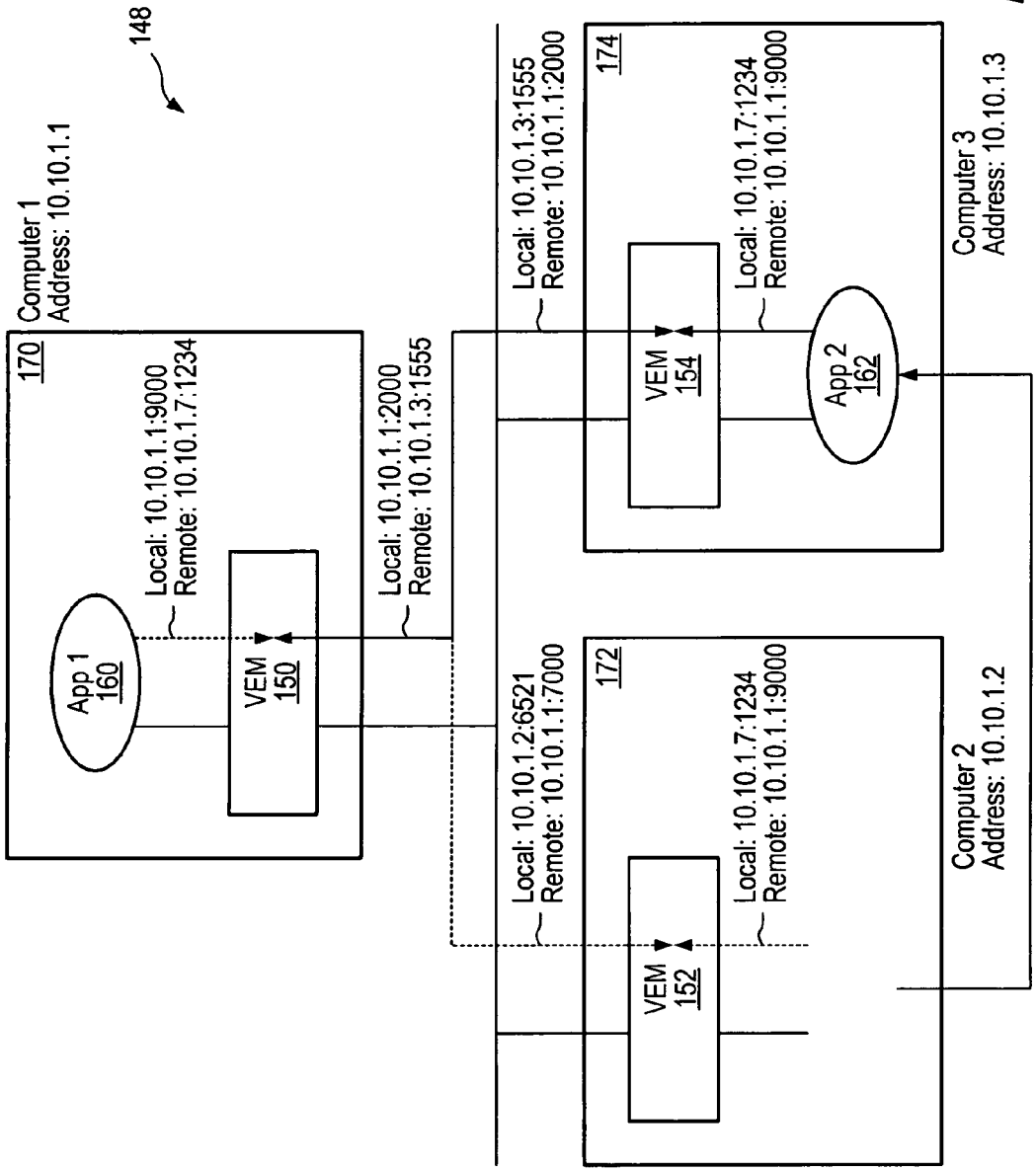
FIG. 8B show one example of one embodiment of the present invention similar to that shown in FIGS. 2 and 8A where the data channel between the first computer and the second computer has been taken down, and the second application is reestablished on the third computer.

Referring to FIGS. 3 and 8A, initially, as is described above, the data channel 166 is established between the first application 160 operating on the first computer 170 and the second application 162 operating on the second computer 172, as shown in FIG. 8A. As described above in relation to FIG. 4, the data channel 166 is taken down between first and second applications 160, 162 and the second application 162 is halted or snapshotted. Referring to FIG. 8B which shows one example of one embodiment where the data channel 166 between the first computer 170 and the second computer 172 has been taken down, and the second application 162 is reestablished on the third computer 174. In this embodiment the data channel 166 is reconstructed between the first computer 170 and third computer 174 as described above in relation to FIG. 5. The virtual endpoint translation tables for the first and third computers are updated to include the virtual addresses and to show the status of the data channel as active. The present invention allows the data channel 166 to be reconstructed without the knowledge of the first or second applications 160, 162 and further, to be reconstructed between different computers without altering or affecting the data and without the knowledge of the applications 160, 162.

The examples provided by FIGS. 8A and 8B shows one embodiment where the virtual addresses used by the second application 162 does not correspond to an actual addresses of the node or computer where the applications resides. For example, the second application 162, is initially operated from the second computer 172 (see FIG. 8A) which has an IP address of 10.10.1.2. However the virtual address of the second application 162 is using the virtual IP address 10.10.1.7. When the second application 162 is moved to the third computer 174 (see FIG. 8B), which has a virtual IP address of 10.10.1.3, the virtual address for the second application 162 remains 10.10.1.7.

Figure 9:
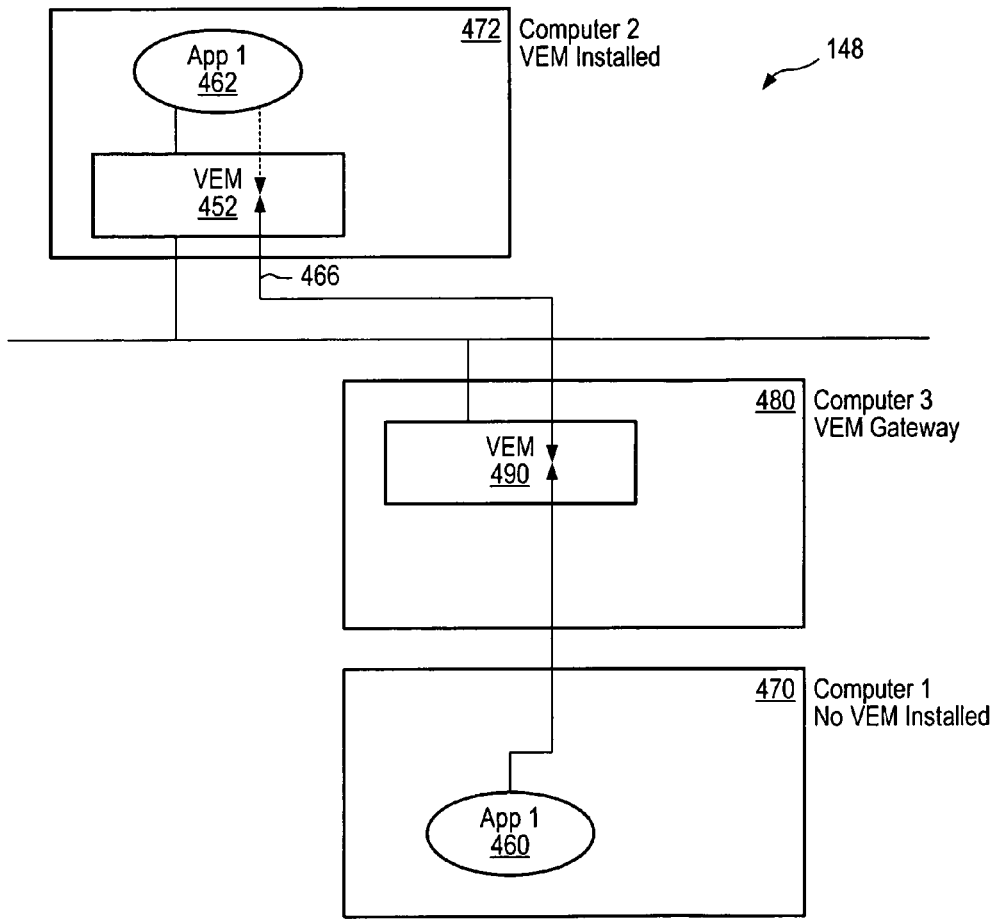
FIG. 9 shows a simplified block diagram of one embodiment of the present invention where a gateway provides the virtual endpoints for a first application operating on a first computer.

In the embodiments shown in FIGS. 2, 8A and 8B, each application is operated within a computer 170, 172, 174 having a VEM 150, 152, 154, respectively. However, in alternative embodiments, the present invention provides virtual endpoints for applications operating on computers without VEMs. FIG. 9 shows a simplified block diagram of one embodiment of the present invention where a first application 460 operating on a first computer 470 is attempting to communicate with a second application 462 operating on a second computer 472. In this embodiment, first computer 470 does not include a VEM. The present invention allows the first application to use virtual endpoints by utilizing alternative VEMs on the system 148 to provide the virtualization. In one embodiment, the first computer 470 is coupled with a gateway 480. The gateway 480 transparently provides first computer 470 and first application 460 with access to the VEM system 148 and the virtualization of the local and remote addresses. The gateway 480 includes a gateway VEM 490 which receives the data communication from the first application 460 and generates the data channel 466 between the first application 460 and the second application 462.

In one embodiment, any calls to get the local or remote address (e.g., getsockname, getpeername) get intercepted by the VEM. The VEM returns the virtual addresses associated with the application's endpoint.

Figure 10:
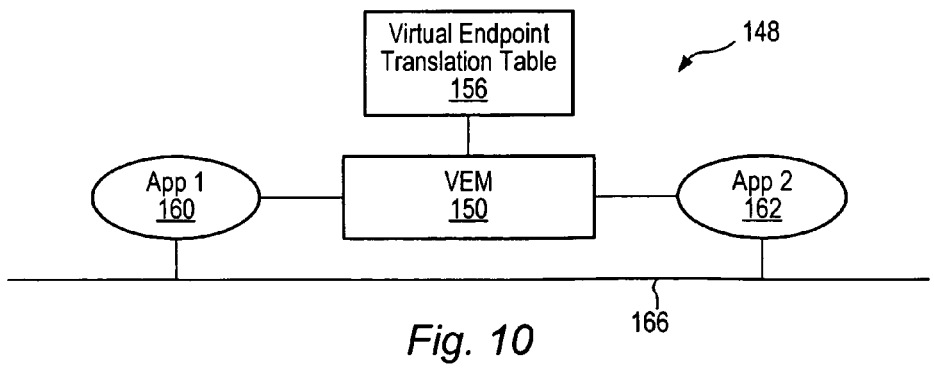
FIG. 10 shows a simplified block diagram of one implementation of one embodiment of the present virtual endpoint system where a single VEM provides the virtual endpoints for the plurality of communicating applications.

In one embodiment, two applications are capable of communication utilizing the virtual endpoints of the present invention through a single VEM. The single VEM provides the transparent construction, destruction and reconstruction of a data channel to provide the communication between the two applications. FIG. 10 shows a simplified block diagram of one implementation of one embodiment of the present virtual endpoint system where a single VEM 150 provides the virtual endpoints for the plurality of communicating applications. The VEM 150 establishes the data channel 166 as described above without the need to coordinate the data channel 166 with an additional VEM. Further, the VEM 150 maintains the virtual addresses of each application in the virtual endpoint translation table 156 and associates the data channel with the application sockets as described above. In one embodiment, the single VEM providing virtualization of both application addresses is implemented where first application 160 and second application 162 reside on the same computer.

Having disclosed exemplary embodiments and the best mode, modifications and variations may be made to the disclosed embodiments while remaining within the scope of the present invention as defined by the following claims.

What is claimed is:

1. A method comprising:
receiving a request to deconstruct a first data channel existing between a first application on a first computer and a second application on a second computer, wherein the request is from a source separate from the first application and the second application;
deconstructing the first data channel responsive to the request and transparent to the first application and the second application;
receiving a communication from the first application for transmission to the second application subsequent to deconstructing the first data channel;
constructing a second data channel between the first application and the second application responsive to the communication and transparent to the first application and the second application;
prior to deconstructing the first channel, executing the first application on the first computer; and
migrating the first application to a third computer from the first computer transparent to the first application and the second application, wherein the migrating is performed subsequent to deconstructing the first data channel and prior to constructing the second data channel, and wherein the migrating comprises stopping the executing of the first application on the first computer and starting the executing of the first application on the third computer, wherein the constructing is between the first application on the third computer and the second application on the second computer.

2. The method as recited in claim 1 wherein the second data channel provides communication with the second application on the second computer.

3. The method as recited in claim 1 wherein deconstructing the first data channel comprises updating a status corresponding to the first data channel to indicate that the first data channel is down, wherein the status is not accessible to the first application and the second application.

4. The method as recited in claim 3 wherein constructing the second data channel comprises updating a status corresponding to the second data channel to indicate that the second data channel is up.

5. The method as recited in claim 1 wherein deconstructing the first data channel comprises disassociating the first data channel from a first socket used by the first application.

6. The method as recited in claim 5 wherein deconstructing the first data channel further comprises disassociating the first data channel from a second socket used by the second application.

7. The method as recited in claim 6 wherein constructing the second data channel comprises associating the second data channel with the second socket.

8. The method as recited in claim 5 wherein constructing the second data channel comprises associating the second data channel with the first socket.

9. The method as recited in claim 1 further comprising communicating among two or more computer systems using a control channel to coordinate the deconstructing of the first data channel and the constructing of the second data channel.

10. A memory storing a plurality of instructions including instructions which, when executed:
receive a request to deconstruct a first data channel existing between a first application on a first computer and a second application on a second computer, wherein the request is from a source separate from the first application and the second application;
deconstruct the first data channel responsive to the request and transparent to the first application and the second application;
receive a communication from the first application for transmission to the second application subsequent to deconstructing the first data channel;
construct a second data channel between the first application and the second application responsive to the communication and transparent to the first application and the second application;
prior to deconstructing the first channel, execute the first application on the first computer; and
migrate the first application to a third computer from the first computer transparent to the first application and the second application, wherein the migrating is performed subsequent to deconstructing the first data channel and prior to constructing the second data channel, and wherein the migrating comprises stopping the executing of the first application on the first computer and starting the executing of the first application on the third computer, and wherein the second data channel is constructed between the first application on the third computer and the second application on the second computer.

11. The memory as recited in claim 10 wherein deconstructing the first data channel comprises updating a status corresponding to the first data channel to indicate that the first data channel is down, wherein the status is not accessible to the first application and the second application.

12. The memory as recited in claim 11 wherein constructing the second data channel comprises updating a status corresponding to the second data channel to indicate that the second data channel is up.

13. The memory as recited in claim 12 wherein constructing the second data channel comprises associating the second data channel with the first socket.

14. The memory as recited in claim 10 wherein deconstructing the first data channel comprises disassociating the first data channel from a first socket used by the first application.

15. The memory as recited in claim 10 wherein the instructions, when executed, communicate over a control channel to coordinate the deconstructing of the first data channel and the constructing of the second data channel.

16. A computer comprising:
execution hardware configured to execute instructions; and
a memory coupled to the execution hardware, the memory storing:
a first application; and
an endpoint module coupled to the first application, wherein the endpoint module is coupled to receive a request to deconstruct a first data channel between the first application on the computer and a second application on a second computer, wherein the request is from a source separate from the first application and the second application, and wherein the endpoint module is configured to deconstruct the first data channel responsive to the request and transparent to the first application and the second application, and wherein the endpoint module is configured to construct a second data channel between the first application on the computer and the second application on a third computer responsive to a communication from the first application for transmission to the second application subsequent to deconstructing the first data channel, and wherein the endpoint module is configured to construct the second data channel transparent to the first application and the second application, and wherein the second application executes on the second computer prior to the deconstructing, and wherein, responsive to a migration of the second application from the second computer to a third computer between the deconstructing of the first data channel and the constructing of the second data channel and transparent to the first application and the second application, the endpoint module is configured to construct the second data channel between the first application on the computer and the second application on the third computer, wherein the migration includes stopping the executing of the second application on the second computer and starting the executing of the second application on the third computer.

17. The computer as recited in claim 16 wherein deconstructing the first data channel comprises updating a status corresponding to the first data channel to indicate that the first data channel is down, wherein the status is not accessible to the first application and the second application.

18. The computer as recited in claim 17 wherein constructing the second data channel comprises updating a status corresponding to the second data channel to indicate that the second data channel is up.

19. The computer as recited in claim 16 wherein deconstructing the first data channel comprises disassociating the first data channel from a first socket used by the first application.

20. The computer as recited in claim 19 wherein constructing the second data channel comprises associating the second data channel with the first socket.

21. The computer as recited in claim 16 wherein the endpoint module is configured to communicate with endpoint modules on the second computer and the third computer using a control channel to coordinate the deconstructing of the first data channel and the constructing of the second data channel.

* * * * *